United States Patent [19]
MacLeod et al.

[11] Patent Number: 5,617,272
[45] Date of Patent: Apr. 1, 1997

[54] ADHESIVELESS SEAL ASSEMBLY INCORPORATING MAGNETIC SEAL FOR USE WITH DISC DRIVE

[75] Inventors: Donald J. MacLeod, Santa Cruz; Peter G. Robinson, Capitola; Long V. Nguyen, San Jose, all of Calif.

[73] Assignee: Seagate Technology, Inc., Scotts Valley, Calif.

[21] Appl. No.: 553,960

[22] Filed: Oct. 23, 1995

Related U.S. Application Data

[63] Continuation of Ser. No. 236,521, May 2, 1994, abandoned.
[51] Int. Cl.⁶ .................................................. G11B 17/02
[52] U.S. Cl. .................................... 360/99.08; 277/80
[58] Field of Search ........................... 360/98.07, 99.04, 360/99.08; 277/80

[56] References Cited

U.S. PATENT DOCUMENTS 5,267,737  12/1993  Cossette et al. ...................... 277/80

*Primary Examiner*—Robert S. Tupper
*Attorney, Agent, or Firm*—Flehr, Hohbach, Test, Albritton & Herbert

[57] ABSTRACT

A magnetic fluid seal is provided located in an L-shaped holder for defining the location of the seal relative to the shaft and bore. The magnetic seal is located inside the knee of the L-shaped holder, with a small magnetic fluid filled gap between the end of the magnetic seal and the fixed shaft. Immediately below the pieces and magnet of the magnetic seal is a gasket which provides for an airtight seal between the edge of the L-shaped holder and the outer wall or rotor. The entire assembly is held reliably in place by a shield which is typically press-fitted in place. The shield is designed to incorporate two key design features; (1) the outside diameter of the shield is a press-fit to the inside of the bore defined by the rotor; and (2) at its final axial location the shield presses vertically against the gasket, whereby the gasket is compressed to an approximate degree (for example about 50%) to provide press fitted contact covering the opening between the seal face outside diameter, and the bore of the rotor, thus providing a complete airtight seal at the outer diameter of the seal.

8 Claims, 3 Drawing Sheets

5,617,272

ADHESIVELESS SEAL ASSEMBLY INCORPORATING MAGNETIC SEAL FOR USE WITH DISC DRIVE

This is a continuation of application Ser. No. 08/236,521 filed May 2, 1994 now abandoned.

CROSS REFERENCE TO RELATED APPLICATION

The subject invention is useful in most disc drives; a typical example is shown in U.S. application Ser. No. 07/893,641 filed Jun. 5, 1992 assigned to the assignee of the present application and incorporated herein by reference.

FIELD OF THE INVENTION

This invention relates to magnetic disc devices and particularly to an improved spindle motor design for use in a disc drive, incorporating a magnetic seal to prevent contaminants generated by the motor from entering the sealed head disc assembly of the disc drive.

BACKGROUND OF THE INVENTION

Disc drive units in general are known in the art for use in modern microcomputers such as personal and desk top computers. In the most common form, such disc drive units comprise a so-called Winchester disc drive having one or more rotatable memory storage discs mounted within a substantially sealed disc drive housing along with one or more related electromagnetic heads for reading and writing data on appropriately prepared disc surfaces. A disc drive of this type is sometimes referred to as a hard or a fixed disc drive and is normally available as a compact, complete package with the sealed housing on a rigid chassis or frame together with a circuit board carrying the necessary drive electronics.

Within the sealed disc drive, a rotating constant speed spindle motor is provided for mounting and rotating the discs. Because of the extremely fine tolerances in the internal components to the disc drive especially the head and the disc surface, the head disc assembly is sealed against the outside air to prevent the entry of contaminants. In order to minimize the size of the disc drive, modern spindle motors are designed with many components inside the hub which supports the discs. Therefore, obviously, it is also critical to provide a seal between the spindle motor which mounts the discs for rotation and the interior of the head disc assembly. Magnetic fluid seals are already widely used in spindle motors for disc drives as a means to seal either the external components from the inside of the drive, thus preventing external contaminants such as dust particles from entering the head disc assembly; or are used to seal portions of the regions within the head disc assembly to prevent the flow of air through the motor bearings, thus preventing particles such as grease aerosols from circulating from the motor into the interior of the head disc assembly.

It is standard practice in the disc drive industry in using magnetic fluid seals to use an adhesive to retain the seal in its defined location, and to prevent airflow around the outside diameter of the seal. A typical example of such a device shown in the simplest form appears in FIG. 1 and includes a housing 1 and shaft 3. A pair of annular pole pieces 13 and 15 are provided, sandwiching a permanent magnet 11 which is integrally inserted therebetween to form the ferro-fluidic seal of the device. The ferro-fluid 9 is disposed between the pole pieces 13 and 15 and the shaft 3.

The magnet 11 causes the ferro-fluid to be retained in place between the pole-pieces 13 and 15 and the shaft 3 so that a seal is formed through which contaminants cannot pass. As shown in this example, which is taken from U.S. Pat. No. 5,161,902, in order to prevent contaminants from passing through the outer radial gap G between the housing 1 and the pole pieces 13, 15, the gap between at least one of the pole pieces and the housing is filled with an adhesive bonding agent 23.

As disclosed in that patent and as is common practice in the industry, the bonding agent 23 serves to completely prevent foreign material from entering the inside space through the sealing device. As further disclosed in the prior art, without the bonding agent 23, foreign materials such as grease which have penetrated through small clearances between the housing 1 and the pole piece 15 and the magnet 11 could pass through the gap G into the inside space of the disc assembly, which must be kept clean. It is known to be highly desirable to eliminate the need for this adhesive because the requirements for the adhesive are particularly demanding, and pose a difficult manufacturing and design problem. The adhesive requirements include maintaining structural strength over temperature cycles of −40° to +70° C.; a fast and complete cure; low outgassing; and being made of an easy to dispense, single component. Very few practical adhesives are available to satisfy all these requirements. Even the adhesives that are available are expensive, and the cost of installation (process time plus tools) is high. Moreover, even the more expensive ones have failed to eliminate the problem of outgassing. Therefore efforts have been made to eliminate adhesives from the assembly of disc drive motors.

SUMMARY OF THE INVENTION

The primary object of the invention is to provide a structure for a magnetic fluid seal especially adapted for use in a disc drive spindle motor which meets the technical requirements of the application without the use of adhesives.

More specifically, it is an object of the invention to provide such a magnetic fluid seal assembly which can be achieved at a lower cost and without the use of adhesives.

It is a further objective to provide for easy assembly of a magnetic seal and spindle motor using simple tools.

A related objective of the present invention is to provide for improved reliability of the magnetic fluid seal in a spindle motor, while eliminating the chance of uncured adhesives and outgassing.

Yet another related objective of this invention is to provide for ease of assembly of a two-bearing cartridge incorporating a fixed shaft, two bearings, a magnetic fluid seal, and the outer rotor; such a cartridge may be easily and readily installed in a disc drive to reduce costs and time of assembly.

These and other objectives of the present invention are achieved by providing a combination of a magnetic fluid seal, located in an L-shaped holder for defining the location of the seal relative to the shaft. The magnetic seal is located inside the knee of the L-shaped holder, with a small magnetic fluid filled gap between the end of the magnetic seal and the fixed shaft. Immediately below the pieces and magnet of the magnetic seal is a gasket which provides for an airtight seal between the edge of the L-shaped holder and the outer wall or rotor. Thus below the bearing on the shaft, the magnetic seal is reliably located by the holder. The interior gap of the magnetic seal is filled by ferro-fluidic fluid; the exterior gap between the holder and the outer rotor wall is sealed off by the gasket.

The entire assembly is held reliably in place by a shield which is typically press-fitted in place. The shield is designed to incorporate two key design features; (1) the outside diameter of the shield is a press-fit to the inside of the bore defined by the rotor; and (2) at its final axial location the shield presses vertically against the gasket, whereby the gasket is compressed to an appropriate degree (for example about 50%) to provide press fitted contact covering the opening between the seal face outside diameter, and the bore of the rotor, thus providing a complete airtight seal at the outer diameter of the seal.

A suitable material for the gasket is a closed-cell foam such as Poron. In principal, a wide range of elastomeric materials may be usable. The flat gasket washer shape makes it very inexpensive and easy to produce.

The objectives of the invention are further achieved by the press-fit shield which holds the elements of the adhesive seal design in place and is easy to install with a simple press-fitting tool.

The features and advantages of the present invention will be better understood by reference to the following figures and the detailed description given in conjunction with those figures.

BRIEF DESCRIPTION OF THE DRAWINGS

A detailed description of the present invention will be given in conjunction with the following drawings wherein.

DETAILED DESCRIPTION OF THE PREFERRED EMBODIMENT

Figure 1:
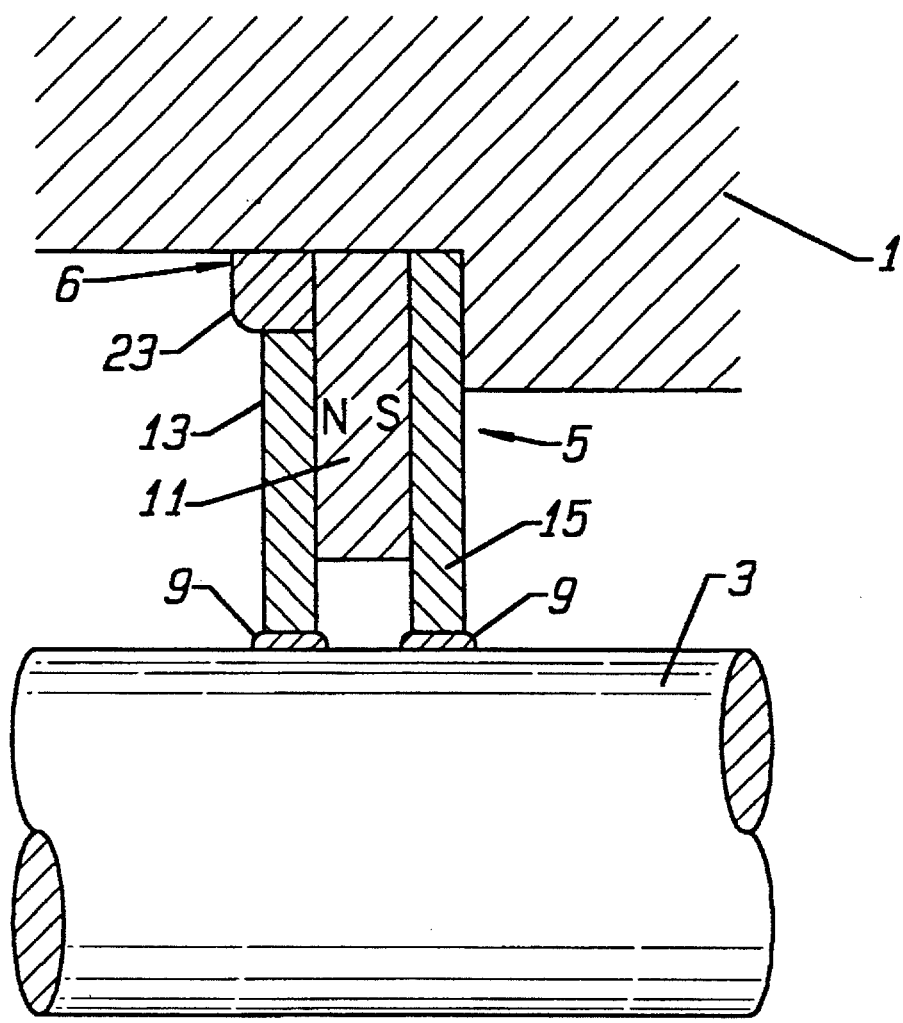
FIG. 1 is an expanded diagrammatic view of a prior art magnetic seal.
Figure 2A:
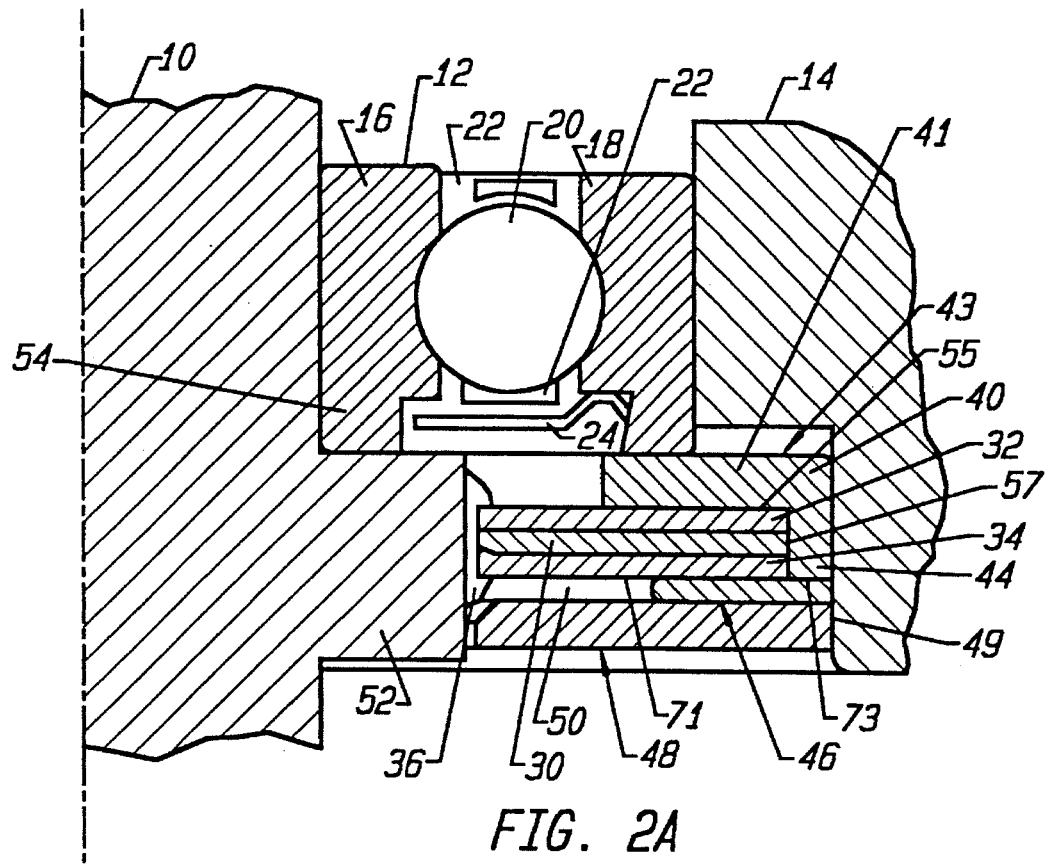
FIGS. 2A and 2B are an expanded view of details of the adhesiveless seal of the present invention.
Figure 2B:
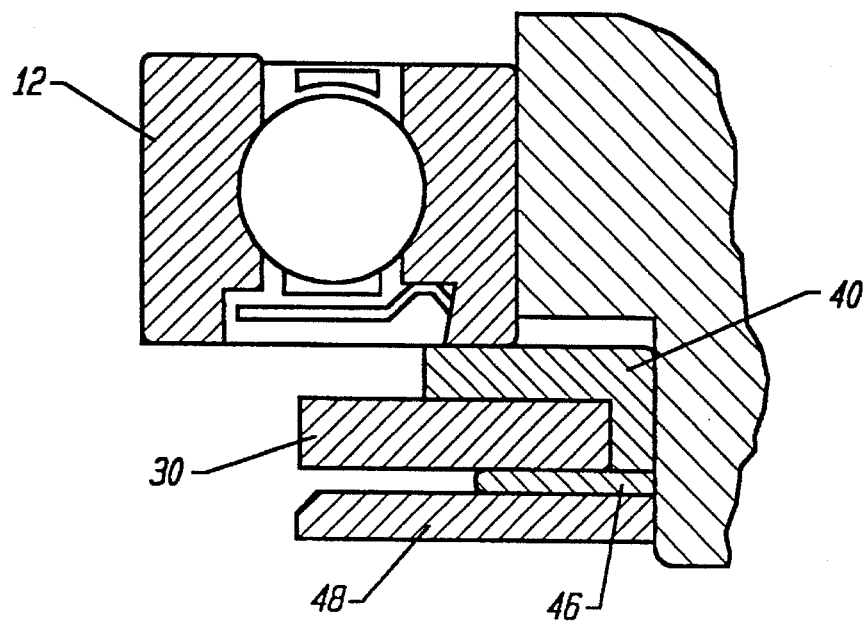
Figure 3:
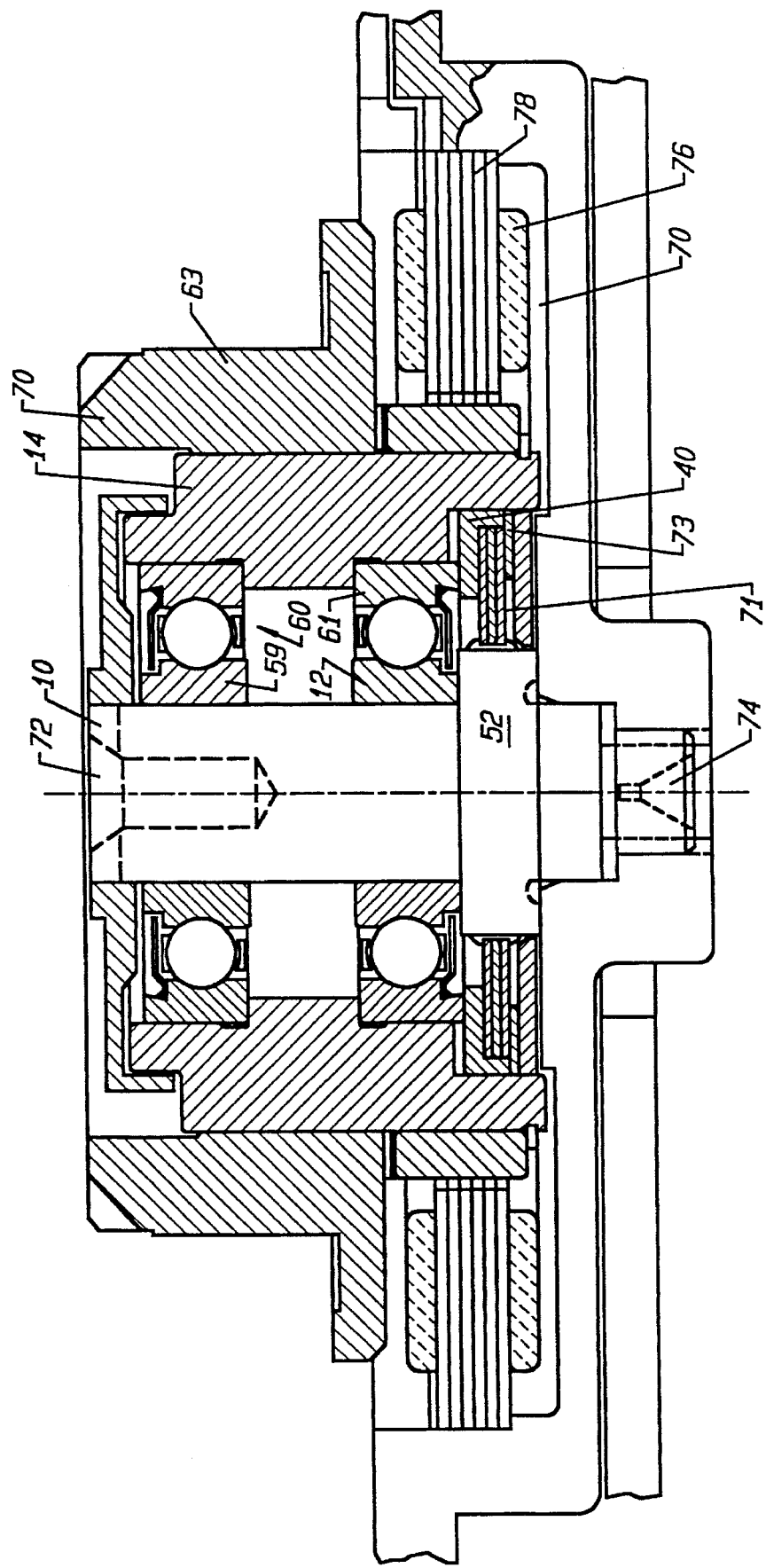
FIG. 3 is a vertical sectional view of a spindle motor incorporating the magnetic seal of the present invention.

Details of the adhesiveless seal of the present invention are most clearly apparent from the sectional view of FIGS. 2A and 2B taken in conjunction with the spindle motor layout design of FIG. 3. FIG. 2 will be referred to below to explain the details of the seal; FIG. 3 shows the incorporation of the seal in an in-hub spindle motor of the type which is especially useful in a disc drive. The motor of FIG. 3 in fact is shown mounted in the base casting of a typical disc drive as will be described more fully below.

Turning first to FIGS. 2A and 2B, the adhesiveless seal design of the present invention is illustrated in combination with a stationary shaft design motors as shown in this preferred embodiment; however, the features herein may be adapted for use with and are equally useful with rotating-shaft motors. Referring first to FIG. 2, the figure shows the adhesively sealed design of the present invention used in conjunction with a fixed-shaft motor, the shaft shown broken away at 10; a magnetic bearing of a standard design 12, and a rotor 14 supported on the outside of the bearing 12. The rotor is of a type typically used in disc drives to support one or more discs for rotation at a constant speed, and is shown more clearly in FIG. 3. It should be noted that the usefulness of the invention is not limited to bearings of a specific design as shown at bearing 12; the seal can be used with any type of bearing to prevent escape of particles into the disc drive.

As can be seen from FIG. 3, it is very important to provide a magnetic seal adjacent at least one of the bearings in a spindle motor to be used in a disc drive. The seal is provided so that particles generated during high speed rotation of the spindle motor cannot escape into the sealed atmosphere of the head disc assembly. In the preferred embodiment shown in FIG. 2 and in FIG. 3, the magnetic seal of the invention is provided immediately adjacent the lower bearing of the two bearings 59, 61 that support the rotor 63 for rotation around the fixed shaft 10 of the motor.

Considering one of the ball bearings in greater detail (FIG. 2), it includes an inner-race 16 fitted on the central shaft 10, an outer race 18 surrounding the inner race 16, and an annular series of balls 20 interposed between the races 16, 18. The balls 20 are typically held in place by a pair of annular retainers 22; a grease seal plate 24 extends radially inward from the outer race 18 to a point somewhat short of the inner race 16 so that an annular space is formed which may be filled with grease as is well known in this technology to ensure smooth relative rotation between the races.

The magnetic seal of this invention is arranged in the motor at one end of this bearing 12 and is interposed between the stationary central shaft 10 and the rotor or hub 14 of the spindle motor which will rotationally drive one or more data carrier discs. Specifically, to form the magnetic seal an annular permanent magnet 30 is axially sandwiched between a pair of annular pole pieces or plates 32, 34. The combination so formed is together fitted in the hub to extend radially inward, so that an axially extending annular sealing clearance or gap 36 (shown in dark) is defined between the fixed shaft 10 and the magnet 30 (including pole plates 32, 34).

According to the illustrating example, and following technology for magnetic seals which is well-developed, the upper plate 32 provides an N-pole while the lower pole plate 34 provides an S-pole. Ferro-fluidic fluid is floated in the gap 36 between the shaft and the pole plate or pole plates. This magnetic fluid seals the gap between the ends of the magnet and the pole pieces 30, 32, 34 and the shaft 10, so that any particles generated by rotation of the rotor and bearings are confined near the bearing and cannot escape into the head disc assembly.

The magnetic seal described above is itself well-known. It is the means for precisely and permanently locating it between rotor and shaft that primarily comprises the present invention's contribution to rotor and disc drive technology.

The improved seal assembly defined herein provides an L-shaped holder 40 having a horizontal leg 41 with a horizontal top surface 43 running parallel to the major elements of the magnetic seal; the top planar surface 43 locates the seal by virtue of pressing against the bottom of the bearing although it could also be located in whole or in part against an interior horizontal surface of the rotor as shown in FIG. 2B. This holder also includes a vertical leg 44 having an outer, vertical planar surface 57 running substantially parallel to the motor shaft 10. In this particular embodiment, the planar surface 57 is aligned against a vertical interior surface of the rotor 14. However, as shown in FIG. 2B, this is not necessary, since any gap between holder and wall is sealed by gasket 46.

The depth of the vertical interior dimension of the holder 40 is chosen so that the three elements, pole pieces 32, 34 and magnet 30, of the magnetic seal are located against the interior horizontal and vertical surfaces 55, 57 of the holder 40; in this way the seal is accurately radially positioned to be maintained concentric to the fixed motor shaft 10.

As can be further seen in the FIG. 2, the horizontal planar surface 71 of the lower pole piece 34 is aligned with the end surface 73 of the base of the L-shaped holder. This alignment is provided so that a gasket 46 which is a washer shaped element formed of a closed cell foam may be installed axially adjacent to the seal 34 and holder 40. The gasket 46 seals any gap between the outer diameter of the seal 34 itself and the interior surface of the rotor against allowing passage of any particles; a seal is formed from the bottom surface of the seal 34 and its holder 40 to the inner diameter of the rotor 70. Thus, the only other potential path for particles is through the opening 36 between the seal 34 and shaft 10; but this opening is sealed against passage of particles by ferrofluid 36.

The seal assembly is completed by installing the shield 48 adjacent to and pressed tightly against the gasket 46. The shield 48 has two key design features: (1) the outside diameter of the shield is a press-fit to the bore 49 which is the internal surface of the rotor 14 so that the shield 48 can be easily installed with a simple press tool and can slide up the bore 49 to be pressed tightly against the gasket 46; (2) the shield 48 is toleranced such that at its final axial location, the gasket 46 is compressed to an appropriate degree (for example, 50%) to provide a very firm and permanent compressive contact between the lower radially extending surface 50 of magnetic seal 34, the holder 40, and the outer diameter of the bore 49 so that a complete airtight seal at the outer diameter of the bore 49 is created without the use of adhesives or the like to confirm the sealing effect. It is for this reason that the materials for the gasket 46 must be compressible without losing their sealing qualities; a typical material would be a closed cell foam such as Poron, although a wide range of elastomeric materials may be usable. It should be noted that the shield 48 extends from the outer diameter where it is press-fit against the edge of the bore 49 almost to an inner-diameter defined by laterally extended portion 52 of shaft 10. The shield 48 extends this far so that in addition to holding and compressing the gasket and thereby the elements of the adhesiveless seal together in a fully reliable manner.

It can also be seen that in addition to providing an alignment and closure surface for the magnetic shield and seal, that the extended portion 52 of the shaft 10 also provides a horizontal alignment surface 54 on which the lower bearing 12 of the motor can rest.

In summary, the characteristics of this improved seal assembly include the provision of an L-shaped holder 40 having axial and radial legs 55, 57 on its internal surface for axial and radial location of the ferro-fluidic seal 34. The gasket 46 seals the outer diameter of the seal itself and seals the bottom surface of the seal and holder against the bore of the rotor. Thus, it can be seen that even though no adhesives have been provided, the only other path for particles to follow is through the ferro-fluid 36 itself, a path which of course has been closed off. If the seal and the gasket 46 are functioning properly, the entire internal bore between the rotor 14 and the shaft 10 are sealed.

The shield 48 itself is preferably or typically of a non-magnetic stainless steel so that it does not effect the performance of the disc drive or the ferro-fluidic seal in any way. The holder 40 is typically a non-magnetic stainless steel, aluminum or plastic. It must be selected of a material which can provide precise axial and radial location of the magnetic seal and therefore is typically of a machined material. The seal which includes the two outer-pole pieces 32, 34 and magnet 30 provides a magnetic path through the pole pieces, the magnet and seal, with the shaft also being used as a conductive path so that the ferro-fluid 36 is reliably held in place between the end of the magnetic seal 34 and the radially extended portion of the shaft 10.

It should also be noted that the fluid 36 itself is, in a preferred embodiment, a standard type provided by Ferro-Fluidics Company; it is chosen to provide electrical conductivity to discharge the static charge built up by the spinning discs, so that the bearings are bypassed and do not become a part of the discharge path.

Referring next to FIG. 3, this figure illustrates the use of the adhesiveless seal design in the context of a disc drive. Therefore, the elements of the disc drive spindle motor itself which are well known in the technology will not be discussed in detail, and the same reference numbers are used to indicate the same or similar elements as they appear in both FIGS. 2 and 3. It can be seen from this figure that the fixed shaft 10 supports the inner race of both the lower bearing 12 and an upper-bearing 60. The outer races of the bearings support a rotating portion of the rotor 14 which provides alignment surfaces for locating both the outer race of the upper bearing and the outer race of the lower bearing.

Referring especially to the lower bearing 12 which is adjacent to the magnetic seal 34, it can be seen that this bearing 34 is held in place by a combination of the surface on the interior bore of the rotor 14, the surface on the extended portion 52 of the fixed shaft 10, and the holder 40 which is present to provide the axial and radial alignment of the magnetic bearings. The support for the discs in the disc drive is shown at 70, although the discs themselves are not shown. It can also be seen and is represented at 72, 74 that means are provided for fixing both the upper and lower ends of the fixed shaft into the base of the disc drive housing. The windings 76 and stack 78 of the spindle motor are also shown. It is also readily apparent from FIG. 3 that the placement of the magnetic seal 32, 34, 36 immediately below the lower bearing 12 prevents any particles from traveling from that bearing through the gap 70 which exists below the area left for rotation of the hub and around that channel into the airspace inside the head disc assembly.

From a study of the invention thus described, it is obvious that it may be varied in other ways than suggested therein. For example, the shaft, bearings and rotor could be delivered as a cartridge for easy installation in a complete system by fixing the stationary shaft 10 in a base and top cover using locating bosses 72, 74. Although this application uses a closed-cell foam, other applications may be suited for a low density rubber. The gasket should not be limited in any way to a porous material. Such variations are not to be regarded as a departure from the spirit or scope of the invention and also its modifications as would be obvious to those skilled in the art and is intended to be included in the scope of the following claims.

What is claimed:

1. A magnetic seal comprising a generally L-shaped seal holder having horizontal and vertical leg portions, said magnetic seal comprising upper and lower plates and a permanent magnet sandwiched therebetween, said plates and said permanent magnet extending longitudinally along one horizontal surface of said horizontal leg of said holder with ends abutting said vertical leg portion of said holder, said magnetic seal and said holder being adapted to fill a gap between first and second parallel relatively rotating vertical surfaces, with said vertical leg of said holder lying parallel to and abutting said first one of said vertical surfaces, and the other ends of the magnetic seal sandwich extending near to and separated by a narrow gap from the second of said vertical surfaces, said narrow gap between said other ends of said magnetic seal and said second vertical surface being filled by a magnetic fluid held in place by said magnet, a gasket located below said lower plate and said holder having an edge abutting said one vertical surface to seal any gap between said vertical leg portion of said holder and said vertical surface and a shield pressed against said gasket to compress said gasket against one of said magnetic seal plates and said holder to close any gap between said vertical leg portion said magnetic seal and said vertical wall portion against leakage and held in place against said gasket by a press fit within a bore defined by said first vertical surface.

2. A magnetic seal as claimed in claim 1 wherein said gasket is an elastomeric material.

3. A magnetic seal as claimed in claim 1 wherein the lower one of said plates is aligned with the end of said vertical leg portion of said holder to form a planar surface for the gasket to press against.

4. A magnetic seal as claimed in claim 1 wherein said gasket is formed of a closed cell-foam which is compressible to form an air-tight shield.

5. A magnetic liquid seal adapted to be installed in a bore defined between a shaft and a rotor for supporting discs in a disc drive comprising a holder having horizontal and vertical leg portions, said vertical portion of said holder abutting an inner surface of said rotor, said magnetic seal comprising a upper and lower plates, and a permanent magnet sandwiched therebetween, one of said plates extending longitudinally along the horizontal portion of said holder and having a first end surface abutting said vertical leg portion of said holder, said plates having second end surfaces facing toward said shaft and terminating across a narrow gap from said shaft, a ferro magnetic fluid filling said gap between said ends of said plates, said magnet and said shaft so that a mounting for said shaft is effectively sealed from the exterior of said motor, a gasket located below the lower of said plates and said holder to seal any gap between said vertical leg portion of said holder, the lower of said plates and said rotor, and a shield extending substantially across the inner circumference of the bore between the shaft and rotor and press fit inside the rotor to press and compress said gasket against the lower of said plates and said holder to close any gap between said vertical leg portion, said other plate and said rotor against leakage.

6. A magnetic seal as claimed in claims 5 wherein said shaft is a fixed shaft and said bore is defined between said fixed shaft and the rotor for supporting discs for rotation within said disc drive, said bearing holders vertical surface being pressed against the interior rotating surface of said rotor within said disc drive.

7. A magnetic seal as claimed in claim 6 wherein said gasket is an elastomeric material.

8. A magnetic seal as claimed in claim 5 wherein said gasket is formed of a closed cell-foam which is compressible to form an air-tight shield.

* * * * *